United States Patent [19]

Patel

[11] Patent Number: 4,961,219
[45] Date of Patent: Oct. 2, 1990

[54] CIRCUIT FOR SYNTHESIZING AN IMPEDANCE ACROSS THE TIP AND RING LEADS OF A TELEPHONE LINE CIRCUIT

[75] Inventor: Lalit O. Patel, Mesa, Ariz.

[73] Assignee: AG Communication Systems Corporation, Phoenix, Ariz.

[21] Appl. No.: 445,827

[22] Filed: Dec. 4, 1989

[51] Int. Cl.$^5$ .............................................. H04M 1/76
[52] U.S. Cl. .................................. 379/398; 379/394; 379/340
[58] Field of Search ................. 379/30, 394, 340, 403, 379/398

[56] References Cited

U.S. PATENT DOCUMENTS 4,661,978  4/1987  Hirata .................................. 379/394

Primary Examiner—Stafford D. Schreyer
Attorney, Agent, or Firm—Anthony Miologos

[57] ABSTRACT

A circuit for synthesizing an impedance across the tip and ring leads of a telephone line circuit is disclosed. The circuit includes tip drive and ring drive amplifiers connected to the tip and ring leads respectively, of a subscriber loop. The tip drive and ring drive amplifier circuits are arranged to convert feed voltage from a central office battery to feed current to drive the subscriber loop. A common-mode amplifier circuit connected between the tip and the ring leads senses the voltage dropped across the subscriber loop and outputs a control voltage to the tip and ring drive amplifiers, offsetting the feed currents applied to the subscriber loop. A differential amplifier circuit also connected to the tip and ring leads of the subscriber loop, detects a voltage difference between the tip lead and the ring lead and converts the detected differential voltage into a single ended output voltage of a specific gain. The output voltage from the differential amplifier circuit is coupled to a feedback circuit via a series connected resistor and capacitor network. The feedback circuit receives the differential amplifier output voltage that is modified by the values of the resistor and capacitor network and develops a pair of balanced output signals which are equal in amplitude but 180 degrees out of phase with each other. Each of the output signals is connected to a respective one of the tip drive and ring drive amplifier circuits where, an input impedance equal to the impedance of the subscriber loop is derived at the tip and ring leads.

8 Claims, 2 Drawing Sheets 4,961,219

CIRCUIT FOR SYNTHESIZING AN IMPEDANCE ACROSS THE TIP AND RING LEADS OF A TELEPHONE LINE CIRCUIT

CROSS REFERENCE TO RELATED APPLICATIONS

Cross Reference is made to the related U.S. Patent Applications entitled "A Solid State Telephone Line Circuit," application Ser. No. 445,517, filed Dec. 4, 1989; and, "A High Voltage Subscriber Line Interface Circuit," application Ser. No. 445,516, filed Dec. 4, 1989; and "A Tip-Ring Short Detector and Power Shut-Down Circuit For A Telephone Line Circuit," application Ser. No. 445,824, filed Dec. 4, 1989; and "A Thermal Protection Circuit For An Integrated Circuit Subscriber Line Interface," application Ser. No. 445,525, filed Dec. 4, 1989; and "A Thermal Protection Arrangement For An Integrated Circuit Subscriber Line Interface," application Ser. No. 445,501, filed Dec. 4, 1989; and "A Control Circuit For A Solid State Telephone Line Circuit," application Ser. No. 445,826, filed Dec. 4, 1989; and and "A Ring Trip Detector For A Solid State Telephone Line Circuit," application Ser. No. 445,820, filed Dec. 4, 1989; and filed on the same date, and by the same assignee as this Application.

BACKGROUND OF THE INVENTION

1. Field of the Invention

The present invention relates to the field of telecommunications and, more particularly, to a circuit for synthesizing a floating complex impedance across the tip and ring leads of a telephone line circuit.

2. Description of the Prior Art

Telephone line circuits are customarily found in the telephone switching system or central office of a telecommunications network. The telephone line circuit interfaces the central office, to a telephone or subscriber station found at a location remote from the central office. The telephone line circuit functions to supply power or battery feed to the subscriber station via a two wire transmission line or subscriber loop and to couple the intelligence or voice signal to and from the telephone switching system.

In many presently known telephone line circuits the battery feed function has been performed by using a passive, highly balanced, split winding transformer and or inductors which carry up to 120 ma dc. This passive circuit has a wide dynamic range, passing noise-free differential signals while not overloading with the 60 Hz longitudinal induced currents. The line circuit just described, feeds dc current to the subscriber loop and also provides the voice path for coupling the voice signal between the subscriber station and the central office. The electromagnetic components of passive line circuits are normally bulky and heavy and consume large amounts of power for short subscriber loop lengths where the current fed to the subscriber station is more than necessary for equalization. Active line-feed circuits can be less bulky and require lower total power, but meeting dynamic range and precision balance requirements dictates an overly complex circuit design.

Recently, solid state replacements for the electromagnetic components of the aforementioned line circuits have been developed. Devices such as high voltage bipolar transistors and other specialized integrated circuits are being designed to replace the heavy and bulky components of the electromagnetic line circuit. Such a device is described in the *IEEE JOURNAL OF SOLID-STATE CIRCUITS*, VOL. SC-16, NO. 4, August 1981, entitled, "A High-Voltage IC for a Transformerless Trunk and Subscriber Line Interface." These smaller and lighter components allow the manufacture of telephone switching systems having more line circuits per circuit card as well as decreasing the physical size of the switching system.

However, presently known solid state line circuits, still suffer from deficiencies in meeting good transmission performance specifications. These deficiencies manifest themselves in poor longitudinal balance and poor longitudinal current susceptibility, which cause the circuit to fail or to become noisy. Other problems presently encountered are excessive power dissipation at short loops that consume prodigious amounts of central office power and 2 wire input impedance circuits that are complex and that exhibit poor return loss.

Accordingly, it is an object of the present invention to provide a new and more effective circuit that will effectively and efficiently synthesize a complex floating impedance across the tip and ring leads of a telephone line circuit matching the impedance of a connected subscriber loop.

DISCLOSURE OF THE INVENTION

The above and other objects, advantages, and capabilities are realized in a circuit which synthesizes an input impedance and which is connected to a subscribers loop via tip and ring leads. The circuit of the present invention includes a tip drive amplifier circuit connected to the tip lead of the subscriber loop. The tip drive amplifier circuit is arranged to convert feed voltage from a central office battery to tip feed current on the subscriber loop. Similarly, a ring drive amplifier circuit is connected to the ring lead of the subscriber loop. The ring drive amplifier circuit is arranged to convert feed voltage from a central office battery to ring feed current on the subscriber loop.

A common-mode amplifier circuit is included that is connected between the tip and the ring leads of the subscriber loop and to both the tip drive and the ring drive amplifier circuits. The common-mode amplifier circuit is arranged to sense the voltage dropped across the subscriber loop and to output a control voltage to the tip drive and ring drive amplifier circuit. The control voltage allows the tip drive and ring drive amplifier circuits to offset the tip and ring feed current applied to the subscriber loop, thereby, developing a balanced longitudinal impedance to ground at the tip and ring leads.

A differential amplifier circuit connected to the tip and ring leads of the subscriber loop, is used to detect a voltage difference between the tip lead and the ring lead. The differential amplifier circuit converts the detected differential voltage into a single ended output voltage of a specific gain.

The output voltage from the differential amplifier circuit is coupled to a feedback circuit via a series connected resistor and capacitor network.

The feedback circuit comprises an AC summing amplifier circuit and a phase splitter amplifier circuit. The AC summing amplifier circuit receives the differential amplifier output voltage that is modified by the values of the resistor and capacitor network. The AC summing amplifier circuit develops and applies to the phase splitter amplifier an impedance output signal.

The phase splitter amplifier circuit splits its input signal into a pair of balanced output signals that are equal in amplitude but 180 degrees out of phase with each other. Each of the output signals are connected to a respective one of the tip drive and ring drive amplifier circuits where an input impedance equal to the impedance of the subscriber loop is derived at the tip leads and the ring leads.

BRIEF DESCRIPTION OF THE DRAWINGS

A better understanding of the invention may be had from the consideration of the following detailed description taken in conjunction with the accompanying drawings in which.

DESCRIPTION OF A PREFERRED EMBODIMENT

Figure 1:
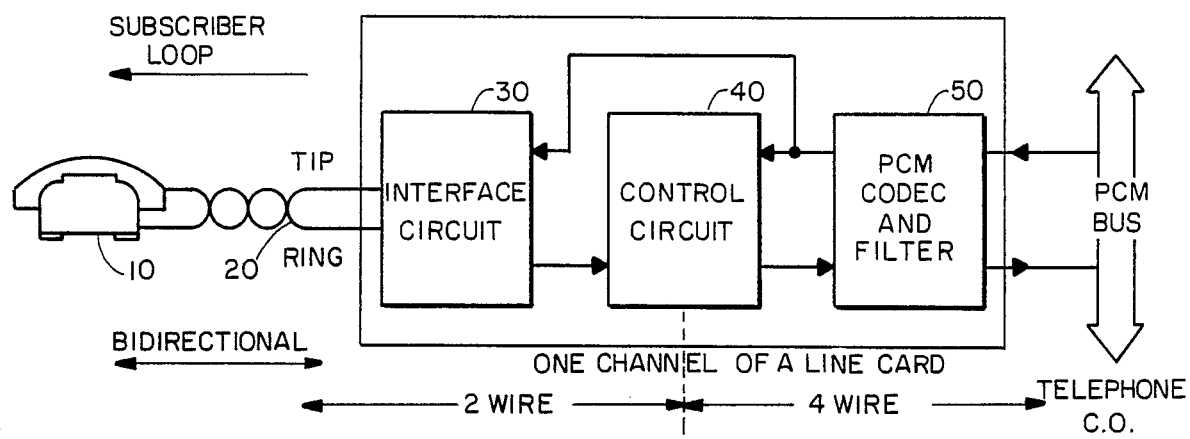
FIG. 1 is a block diagram of a solid state telephone line circuit were the present invention is used to advantage.

Directing attention first to FIG. 1, a broad level block diagram of a solid state telephone line circuit is shown. The line circuit is shown driving a subscriber station or telephone 10, via a subscriber loop 20. The subscriber loop 20 is comprised of a twisted two wire (2W) loop pair having a tip and a ring lead. The 2W loop is connected from the subscriber station 10 to a High Voltage Subscriber Line Interface Circuit (HVSLIC) 30. HVSLIC 30 feeds a −48 V dc voltage to the subscriber loop across the tip and ring leads from a central office battery (not shown). The HVSLIC 30 further functions to superimpose a voice signal on the dc feed voltage and also feed ringing current to subscriber loop 20 for signalling. The HVSLIC 30 still further functions to provide the 2W to 4W (four wire) hybrid function of splitting the balanced signal on the tip and ring leads into separate transmit and receive paths that are ground referenced.

The control circuit 40 works in conjunction with the HVSLIC 30 to provide the dc loop current shaping and the line balance impedance portion of the 2W to 4W hybrid function. The control circuit 40 further controls various detection functions, such as, ring trip detection and loop sense detection, as well as, providing a logic interface to the central controller of the central office switching system.

Most modern digital telephone switching systems use Pulse Coded Modulation (PCM) digital data to convey voice traffic through the central office switching system. Therefore, some method of signal translation is required to convert the analog voice signals received by the interface circuit 30 to PCM digital data. This is typically accomplished by a PCM codex and filter circuit such as shown at 50. These devices are commercially available as a so called CODEC/FILTER COMBO ™ from various manufacturers. Such as the TP30XX family of COMBO ™ devices manufactured by the National Semiconductor Company. Analog voice data from subscriber station 10 is processed by the PCM codex 50 and applied to the PCM bus of the central office switching system for transmission to its destination. Similarly, the codex 50 receives PCM data from the switching system and converts the PCM data into analog signals which are superimposed on the dc feed voltage of the subscriber loop 20.

The three solid state circuits 30, 40 and 50 just described, in combination embody a complete solid state line circuit adapted to connect a single subscriber station to a central office switch.

Figure 2:
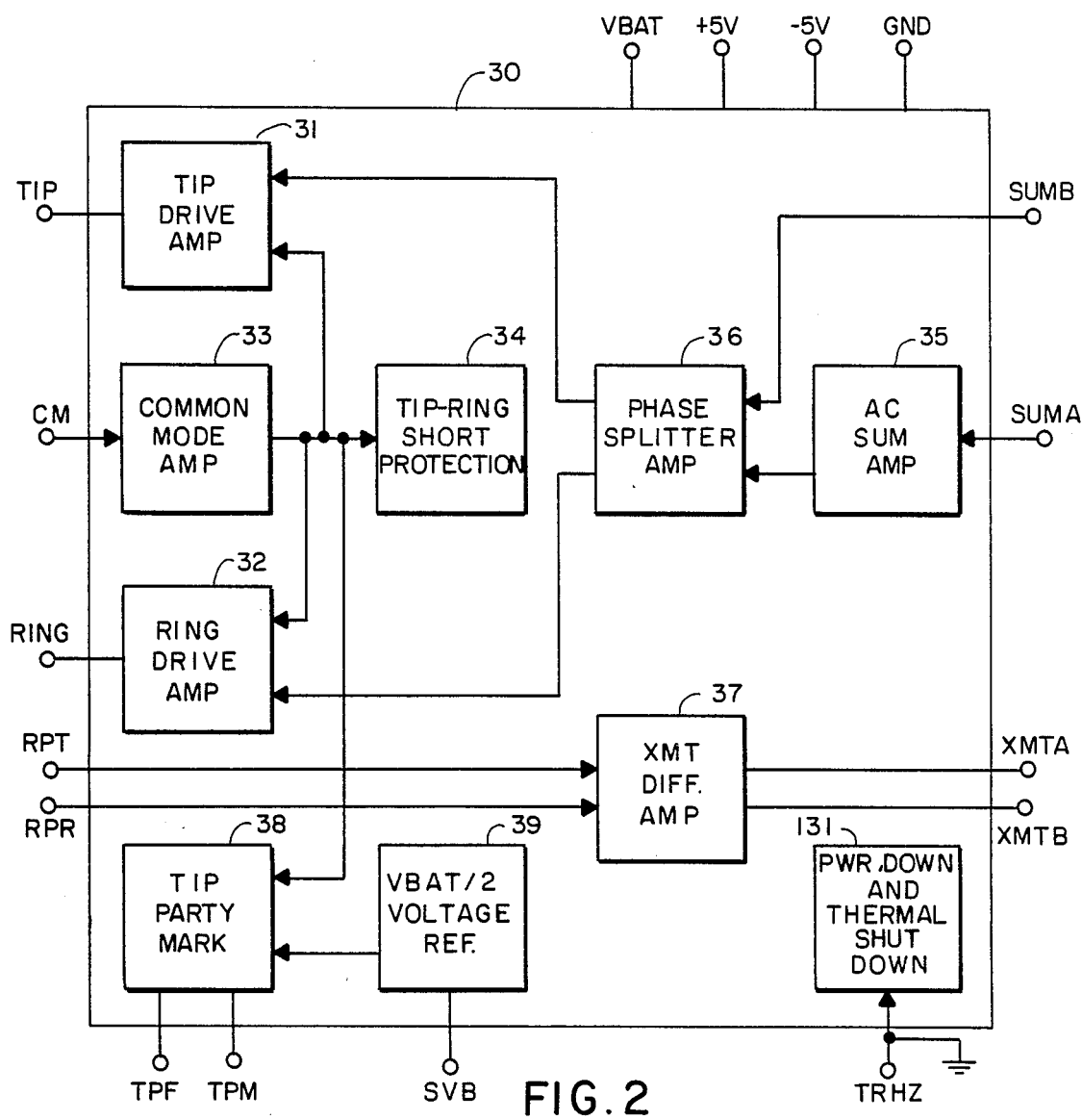
FIG. 2 is a block diagram of the high voltage subscriber line, interface circuit.

Referring now to FIG. 2, a broad level explanation of the functions of HVSLIC 30, will now be given. The HVSLIC 30 shown in FIG. 2, is constructed as a bipolar integrated circuit. All signals requiring high voltages and currents are interfaced by this device. With the addition of a few external discrete components a complete transformerless line interface can be constructed.

The Tip Drive Amplifier circuit 31 and Ring Drive Amplifier circuit 32 function to feed dc and ac voltages and currents to the TIP and RING leads respectively of subscriber loop 20. Voltage input into each amplifier 31 and 32 is converted into output current at the TIP lead and RING lead respectively, of HVSLIC 30. The gain of each amplifier circuits 31 and 32 is set by using four precisely matched internal resistors and one precision external resistor (not shown). Each amplifier circuit 31 and 32 is capable of sourcing or sinking current depending on the input voltage.

The tip and ring amplifier circuits 31, 32 are connected to a Common-Mode Amplifier circuit 33. Amplifier circuit 33 is used to sense the voltage across the subscriber loop 20 and to amplify the voltage by a factor of 3.33. The output of amplifier circuit 33 is fed to amplifier circuit 31 and Amplifier circuit 32. Amplifier circuit 33 is dc biased at one half of the central office battery (Vbat) or VB/2. The Common-Mode Amplifier circuit 33 primarily functions to synthesize a longitudinal (common-mode) input impedance at the TIP and RING terminals of HVSLIC 30 that is a virtual ac ground.

Amplifier circuits 31, 32 and 33 are further connected to a Tip-Ring Short Protection circuit 34. Circuit 34 functions as a detector, which monitors the output of the Common-Mode Amplifier circuit 33. If the output of amplifier circuit 33 is 7.75 volts or closer to either ground or Vbat, the detector places amplifier circuits 31 and 32 into a high impedance mode. This condition represents a combined short of the TIP and/or RING leads to ground or Vbat. When in this short condition, the Tip Drive Amplifier circuit 31 and Ring Drive Amplifier circuit 32 are turned off to remove drive current from the subscriber loop 20.

AC Sum Amplifier circuit 35 functions to sum the receive voice signals with the transmit voice signals. Amplifier circuit 35 provides a ground referenced summing node at the SUMMA terminal of HVSLIC 30. The transmit voice signals are fed to amplifier circuit 35 to synthesize an input impedance of 900 ohms at 2.16 $\mu f$ at the TIP and RING terminals, in accordance with the present invention.

The AC Sum Amplifier circuit 35 is connected to Phase Splitter Amplifier circuit 36. The Phase Splitter Amplifier circuit 36 performs two functions. First, it sums a dc control signal from the control circuit 40 applied to terminal SUMB, with the summed receive and transmit voice signals output by amplifier circuit 35. Second, it level shifts and balances the now combined signals about VB/2 and applies the signals to two output leads. The signals output from the each of the two output leads of amplifier circuit 36 are equal in amplitude, but 180 degrees out of phase with each other. One of the output leads of amplifier circuit 36 is connected to the Tip Drive Amplifier circuit 31 and the other to the Ring Drive Amplifier circuit 32.

The XMT Differential amplifier 37 functions to amplify the voltage difference between the TIP lead and the RING lead of the subscribers loop 20 and applied to terminals RPT and RPR, respectively. These voltage differences which are analogous to the transmit voice signals are amplified and converted into a single ended output by amplifier circuit 37. The single ended voice signals output from amplifier circuit 37 are connected to terminal XMTA and applied via a coupling network (not shown) to the SUMMA terminal. As explained earlier in the description of the AC Sum Amplifier circuit 35, the transmit voice signals applied to the SUMMA terminal are used by amplifier circuit 35 to synthesize the input impedance at the TIP and RING terminals. The transmit voice signals from XMTA are also applied to the control circuit 40, to drive the transmit input of that circuit. A scaled down representation of the signals output from terminal XMTA is output from terminal XMTB. The signals from terminal XMTB are applied to a dc loop control circuit (not shown) on control circuit 40.

A Tip Party Mark Detector circuit 38 is connected to the common mode amplifier 33 and the VBAT/2 battery reference circuit 39. Detector 38 functions to sense a difference voltage between the output of Common-Mode Amplifier circuit 33 and the VB/2 voltage generated by circuit 39. When a difference is sensed a logic signal is generated by detector 38 and applied to the TPM terminal. Under normal operating conditions, the output voltage of amplifier circuit 33 equals the VB/2 reference voltage. However, when a tip party mark is placed on line, the tip current will not equal the ring current. When the voltage from amplifier circuit 33 is sufficiently different than VB/2 the detector trips and outputs its logic signals at terminal TPM.

The VBAT/2 circuit 39 generates from the central office battery (not shown) a reference voltage which is approximately one half of the central office battery voltage input at VBAT. The VB/2 output voltage of circuit 39 is used as a reference by the Common-Mode 33, Phase-Splitter 36 and XMT Differential 37 amplifiers, as well as the Tip-Ring Short Protection circuit 34. A scaled down voltage output is generated by circuit 39 and output from the SVB terminal. This output is used by the aforementioned dc loop control circuit of control circuit 40.

Finally, a Power Down and Thermal Shut Down circuit 131 is included which controls the power dissipation of the HVSLIC 30. The power down function of circuit 131 includes logic input controls arranged to receive logic input signals at terminal TRHZ. When the logic signal at TRHZ is a logic high or "1", all internal HVSLIC 30 amplifiers are put into a high impedance mode. The output drive current and internal bias current to all the amplifiers of HVSLIC 30 is cut off, and thus, the power consumption of HVSLIC 30 is reduced to a minimum. When a logic low or "0" is applied to TRHZ the HVSLIC 30 circuit functions normally. The thermal shut-down function of circuit 131 senses the temperature of HVSLIC 30 and cuts off drive current and internal bias current to the HVSLIC 30 amplifiers if the temperature reaches above 100 degrees C. Therefore, trimming power dissipation.

Figure 3:
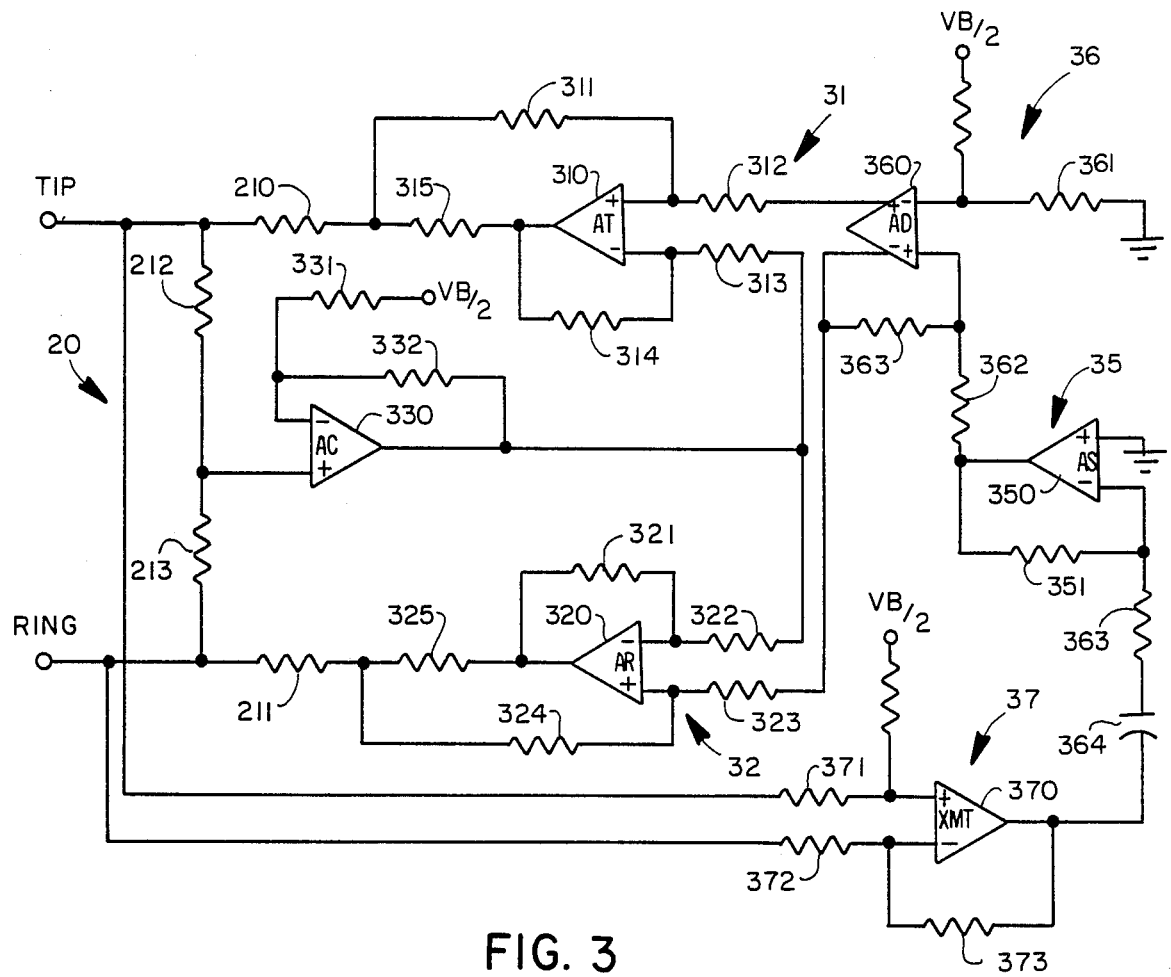
FIG. 3 is an electrical schematic showing the impedance circuit, in accordance with the present invention.

Turning now to FIG. 3, the Tip Drive, Ring Drive, Common-Mode, Phase-Splitter, AC Sum amplifier, and XMT Differential amplifier circuits, are shown, and in combination provide the floating point impedance of the present invention.

There are only two methods of feeding a subscriber loop while maintaining control of the dc and ac impedances required by the circuit. The first method uses voltage drive with series current feedback control. The second, uses current drive with shunt voltage feedback control. The second feed method avoids potential circuit instability which often occurs when a voltage output operational amplifier has a heavy capacitive load. The feed circuit of the present invention uses this second method.

FIG. 3, of the included drawings, shows a subscriber loop termination comprising of a TIP lead and a RING lead. Resistors 212 and 213 combine the TIP and RING voltages and feed the common-mode signal to the Common Mode Amplifier (AC) circuit 33. Tip Drive Amplifier (AT) circuit 31 comprises operational amplifier (op amp) 310, and resistors 311 through 315. Similarly, a Ring Drive Amplifier (AR) circuit 32 comprises op amp 320 and resistors 321 through 325. Resistors 315 and 325 are the feed resistors (RF) of amplifier circuits 31 and 32 respectively. The two symmetrical amplifier circuits 31 and 32 are configured as transconductance amplifiers having a voltage to current gain. AT Amplifier circuit 31 provides drive current to the TIP lead of subscriber loop 20 and AR amplifier circuit 32 provides drive current to the RING lead of the subscriber loop. The transconductance amplifier circuit of each circuit 31, 32 has a differential input and a bi-directional output so that current can be sourced or sunk depending on the differential input voltage applied to the non-inverting (positive) and inverting (negative) inputs of each op amp 310, 320.

A Common-mode Amplifier circuit (AC) 33 comprises op amp 330 and resistors 331 and 332. AC Amplifier circuit 33 is used to drive the inverting (negative) inputs of op amps 310 and 320. Resistors 212 and 213 combine the TIP and RING voltages and feed the common-mode signal to the positive input of op Amp 330. The output of AC amplifier circuit 33 is a function of the bias voltage VB/2, developed by the VBAT/2 voltage reference circuit 39 shown on FIG. 2 and the common-mode voltage (Vcm). Vcm can be expressed as:

$$Vcm = \frac{VTIP + VRING}{2}$$

When the AC amplifier circuit 33 is connected to amplifier circuits 31 and 32, for a given voltage difference between the positive and negative inputs of op amp 310 and 320 the voltage Vcm will be equal to VB/2, or one half the effective central office battery voltage. The loop resistance of subscriber loop 20 floats between the voltage at the TIP and RING leads. The negative feedback produced by AC amplifier circuit 33 is such that common voltages induced on the TIP and RING leads will tend to offset in an equal manner the drive at the outputs of op amps 310, 320. This provides a balanced longitudinal impedance to ground. When (RP+RF)(gm)(1+Ra/Rb)=1 the outputs of op amps 310 and 320 are at an ac virtual ground for any value of longitudinal current. That is, the voltage output by op amps 310 and 320, will not fluctuate as longitudinal current varies. Therefore, the longitudinal impedance can be simply expressed as (RP+RF) at the TIP and RING leads. In principle a large value of longitudinal current that is within the current carrying capacities of amplifiers 31 and 32 can be handled by the amplifier circuits without incidences of voltage excursions at their outputs.

The common-mode feedback developed by AC amplifier circuit 33 only effects signals common to the TIP and RING leads of the subscriber loop 20 and has no effect on the differential signals. One advantage to the arrangement shown in FIG. 3, is that the common-mode feedback is taken after resistors 210 and 211 or the RP resistors. A close matching of RP, over a long period can not be guaranteed due to lightning surges. However, common-mode feedback taken after the RP resistors allows for circuit balance that is insensitive to RP matching.

Differential signals transmitted on the TIP and RING leads of the subscriber loop 20 are detected and amplified by Differential Amplifier (XMT) circuit 37. XMT amplifier circuit 37 includes an op amp 370 having its positive lead connected to an input resistor 371 and to the TIP lead. The negative lead of op amp 370 is connected to input resistor 372 and the RING lead. The single ended output of op amp 370 is also connected to feedback resistor 373. Amplifier circuit 37 functions to amplify the voltage difference between the TIP lead and the RING lead of the subscribers loop 20. The single ended signals output from op amp 370 are connected to summing amplifier circuit 35 via capacitor 364 and resistor 363.

The single ended output signal from XMT amplifier circuit 37 is next applied to AC Sum Amplifier (AS) circuit 35 and Phase Splitter Amplifier (AD) circuit 36. AD amplifier circuit 36 includes op amp 360, input resistors 361, 362 and feedback resistor 363. The positive output of op amp 360 is connected via resistor 312 to the positive input of op amp 310 of the AT amplifier circuit 31. The negative output of op amp 360 is connected to the positive input of op amp 320 of the AR amplifier circuit 32. The output developed by op amp 360 is level shifted and referenced to VB/2. The positive and negative output signals are balanced around half the central office battery voltage. The signals output from the two output leads of op amp 360 are equal in amplitude, but 180 degrees out of phase with each other.

The AS amplifier circuit 35 includes op amp 350 and resistor 351. The negative input of op amp 350 is connected to op amp 370 via capacitor 364 and resistor 363. The output of op amp 350 is connected to the positive input of op amp 360.

AS amplifier circuit 35 functions to provide a ground referenced summing node for signals output from XMT Differential Amplifier circuit 37. The summation of the signals synthesize a 900 ohm 2.16 μf input impedance across the TIP and RING leads. This value of impedance is required to match the twisted pair telephone line impedance normally found in the subscriber loop. The value of capacitor 364 and resistor 363 combined with the gain of the amplifiers in the circuit synthesize the needed value of input impedance.

Figure 4:
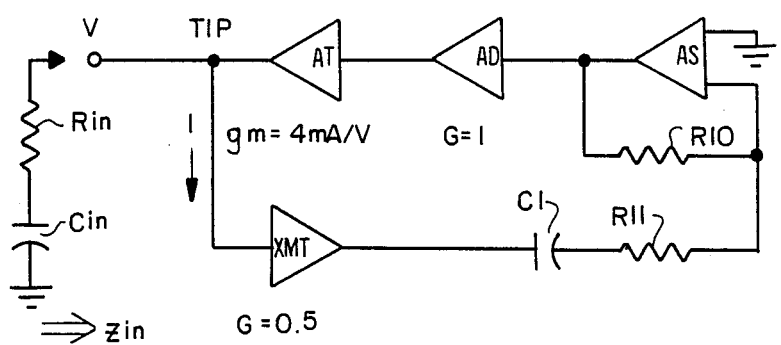
FIG. 4 is an ac equivalent model of FIG. 3, in accordance with the present invention.

Turning now to FIG. 4, an ac equivalent circuit of the TIP side of the circuit of FIG. 3 is shown. The derivation of the input impedance can be expressed mathematically by the following formulas:

$$Zin = \frac{v}{i} \quad (a)$$

$$Zin = Rin + \frac{1}{jwCin} \quad (b)$$

$$= Rin\left(1 + \frac{1}{jwRinCin}\right)$$

$$i = v \times \text{loop gain} \times gm$$

$$= v\left[(XMT) \times AD \times \left(\frac{R10}{\frac{R11+1}{jwC1}}\right)gm\right]$$

$$\frac{v}{i} = \left[\frac{R11}{XMT \times AD \times gm \times R10}\right]\left[1 + \frac{1}{jwR11C1}\right] \quad (c)$$

Therefore, from formulas a, b and c, the input resistance Rin and input capacitance Cin can be expressed by the following circuit relationships.

$$Rin\left(1 + \frac{1}{jwRinCin}\right) =$$

$$\left[\frac{R11}{XMT \times AD \times gm \times R10}\right]\left[1 + \frac{1}{jwR11C1}\right]$$

$$Rin \frac{R11}{XMT \times AD \times gm \times R10}$$

$$Rin\, Cin = R11\, C1$$

$$Cin = \frac{R11\, C1}{Rin}$$

Plugging values to the components of FIG. 3, the current gain or gm at amplifier AT can be found. For example, if resistor 311 (Rc) has a value of 20K ohms, resistors 312 (Ri) a value of 100K ohms and resistor 210 (Rf) a value of 50 ohms, then the current gain of the AT amplifier circuit can be expressed as:

$$gm = \frac{Rc}{Ri \times Rf}$$

$$gm = 4mA/V$$

The gain for amplifiers XMT and AD can be found in a similar fashion. For amplifier XMT the gain is calculated as 0.5 for resistor values of 44K ohms for resistors 371 and 22K ohms for resistor 373. The gain for amplifier AD is calculated as 1.0 for resistor values of 108K ohms for resistor 362 and 363.

The impedance of the equivalent circuit can be determined using the gains of the amplifiers just calculated and inserting values for resistors R10 and R11 and capacitor C1. For example, given a value of 110K ohms for resistor R10, 200K ohms for resistor R11 and a capacitance of 0.01 μf for C1 and using the formulas derived above for Rin and Cin, it can be shown that:

$$Rin = \frac{200K}{0.5 \times 1 \times 4\, mA/V \times 110K}$$

$$= 909 \text{ ohms} \approx 900 \text{ ohms}$$

$$Cin = \frac{200K \times 0.01\mu F}{0.909K}$$

$$= 2.2\mu F$$

It will be appreciated by those skilled in the art that a floating input impedance can be realized using the feedback techniques taught by the present invention. As shown and explained above for a given value of Capacitance (C1) and resistance (R11) a complex impedance can be realized across the TIP and RING leads of a subscribers loop.

It will be obvious to those skilled in the art that numerous modifications to the present invention can be made without departing from the scope of the invention as defined by the appended claims. In this context, it should be recognized that the essence of the invention resides in a new and more effective circuit that will effectively and efficiently synthesize a complex floating impedance across the tip and ring leads of a telephone line circuit having the advantages and capabilities described herein.

What is claimed is:

1. A circuit for synthesizing an input impedance across the tip and ring leads of a subscriber loop, said circuit comprising:
   tip drive means connected to the tip lead of a subscriber loop arranged to convert feed voltage from a central office battery to tip feed current on said subscriber loop;
   ring drive means connected to the ring lead of a subscriber loop arranged to convert feed voltage from a central office battery to ring feed current on said subscriber loop;
   differential sensing means connected to said subscriber loop for detecting a difference in voltage level between said tip lead and said ring lead and arranged to develop a single ended output signal of a specific gain;
   feedback means connected to said differential sensing means via a resistance and capacitance network, said feedback means receiving said differential sensing means output and in combination with said resistance and capacitive network developing a pair of impedance output signals of equal amplitude, each impedance output signal of said pair of impedance output signals connected to a respective one of said tip drive and said ring drive means, whereby, an input impedance equal to the impedance of said subscriber loop is derived at said tip leads and said ring leads.

2. The circuit as claimed in claim 1, wherein said circuit further includes common-mode sensing means comprising an operational amplifier circuit having its positive input connected to a resistor network connected to said tip and ring leads and arranged to receive a common-mode voltage, and a negative input connected to a bias voltage, whereby, said common-mode amplifier circuit develops and outputs to said tip and said ring drive amplifier circuits a negative feedback control voltage which offsets the current drive of said tip and ring drive amplifiers thereby, developing a balanced longitudinal impedance to ground at said tip and ring leads of said subscriber loop.

3. The circuit as claimed in claim 2 wherein, said resistive capacitive network is a resistor and capacitor series connected between said differential sensing means and said feedback means.

4. The circuit as claimed in claim 2, wherein said tip drive means is an operational amplifier circuit operating as a transconductance amplifier converting input voltage to output current gain.

5. The circuit as claimed in claim 2, wherein said ring drive means is an operational amplifier circuit operating as a transconductance amplifier converting input voltage to output current gain.

6. The circuit as claimed in claim 2, wherein, said feedback means comprises an ac summing amplifier circuit and a phase splitting amplifier circuit, said phase splitting amplifier circuit connected to said ac summing amplifier circuit and to a respective one of said ring drive and tip drive means, whereby, said single ended signal from said differential sensing means is input to said ac summing amplifier circuit and subsequently output from said ac summing circuit to said phase splitting amplifier circuit.

7. The circuit as claimed in claim 3, wherein said differential sensing means comprises an operational amplifier having its positive input connected to the tip lead and its negative input connected to the ring lead, said operational amplifier further including an output connected to said resistor and capacitor, whereby, said operational amplifier detects a difference in voltage level between said tip lead and said ring lead and outputs to said resistor and capacitor a single ended output signal of a specific gain.

8. In combination:
   means for converting voltage to current connected to the tip and the ring leads of a subscriber loop, said means for converting arranged to convert input voltage to feed current on said subscriber loop;
   means for detecting connected to said tip and ring leads of said subscriber loop, said means for detecting arranged to sense the voltage difference between said tip lead and said ring lead and develop a single ended output signal of a specific gain;
   network means connected to said means for detecting receiving said single ended output signal; and
   means for developing an impedance output signal connected to said means for detecting via said network means, said means for developing arranged to output to said means for converting an impedance output signal, whereby, an input impedance equal to the impedance of said subscribers loop is derived at said tip leads and said ring leads.

* * * * *